(12) United States Patent
Zhou et al.

(10) Patent No.: US 12,465,297 B2
(45) Date of Patent: Nov. 11, 2025

(54) MULTI-MODALITY DENTAL X-RAY IMAGING DEVICE AND METHODS

(71) Applicant: The University of North Carolina at Chapel Hill, Chapel Hill, NC (US)

(72) Inventors: Otto Z. Zhou, Chapel Hill, NC (US); Jianping Lu, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 239 days.

(21) Appl. No.: 17/527,785

(22) Filed: Nov. 16, 2021

(65) Prior Publication Data

US 2022/0142591 A1    May 12, 2022

Related U.S. Application Data

(63) Continuation of application No. PCT/US2020/035052, filed on May 29, 2020.
(Continued)

(51) Int. Cl.
*A61B 6/00* (2024.01)
*A61B 6/02* (2006.01)
(Continued)

(52) U.S. Cl.
CPC .............. *A61B 6/025* (2013.01); *A61B 6/032* (2013.01); *A61B 6/06* (2013.01); *A61B 6/4007* (2013.01);
(Continued)

(58) Field of Classification Search
CPC .......... A61B 6/14; A61B 6/145; A61B 6/4417
See application file for complete search history.

(56) References Cited

U.S. PATENT DOCUMENTS 6,055,292 A    4/2000  Zeller et al.
6,553,096 B1   4/2003  Zhou et al.
(Continued)

FOREIGN PATENT DOCUMENTS

JP    H0293452 A   4/1990
JP    H0998971 A   4/1997
(Continued)

OTHER PUBLICATIONS

International Search Report and Written Opinion for Application No. PCT/US2020/035052 dated Sep. 14, 2020.
(Continued)

*Primary Examiner* — David P Porta
*Assistant Examiner* — Shun Lee
(74) *Attorney, Agent, or Firm* — KDW FIRM PLLC

(57) ABSTRACT

Multi-modality dental x-ray imaging devices, systems, and methods. In some embodiments, an x-ray imaging system is operable in cone-beam computed tomography, two-dimensional intraoral x-ray, and intraoral tomosynthesis imaging modes. In some embodiments, the device includes a rotatable gantry, an x-ray source array attached to the rotatable gantry and including x-ray focal spots, a digital area x-ray detector attached to the rotatable gantry, an intraoral sensor, an adjustable collimation assembly positioned between the x-ray source array and the subject and configured to limit x-ray radiation to a surface of the intraoral sensor or the digital area x-ray detector depending on the selected imaging mode, and a control unit including one or more processors, the control unit configured to operate the x-ray imaging system in one of the imaging modes.

18 Claims, 8 Drawing Sheets

Related U.S. Application Data

(60) Provisional application No. 62/854,743, filed on May 30, 2019.

(51) Int. Cl.
*A61B 6/03* (2006.01)
*A61B 6/06* (2006.01)
*A61B 6/40* (2024.01)
*A61B 6/51* (2024.01)

(52) U.S. Cl.
CPC ............ *A61B 6/4417* (2013.01); *A61B 6/512* (2024.01); *A61B 6/4085* (2013.01); *A61B 6/4411* (2013.01); *A61B 6/4452* (2013.01)

(56) References Cited

U.S. PATENT DOCUMENTS

| | | | |
|---|---|---|---|
| 9,782,136 B2 | 10/2017 | Zhou et al. | |
| 9,907,520 B2 | 3/2018 | Zhou et al. | |
| 2015/0010126 A1 | 1/2015 | Rotondo et al. | |
| 2015/0359504 A1* | 12/2015 | Zhou | A61B 6/587 378/38 |
| 2016/0317107 A1 | 11/2016 | Zhou et al. | |
| 2018/0235564 A1* | 8/2018 | Jain | A61B 6/50 |
| 2018/0322665 A1 | 11/2018 | Loustauneau et al. | |
| 2019/0252148 A1* | 8/2019 | Travish | A61B 6/4007 |
| 2022/0151576 A1* | 5/2022 | Subramanyan | A61B 6/4233 |

FOREIGN PATENT DOCUMENTS

| | | |
|---|---|---|
| JP | H10243944 A | 9/1998 |
| JP | 2006521130 A | 9/2006 |
| JP | 2014161531 A | 9/2014 |
| JP | 2015504747 A | 2/2015 |
| JP | 2016209724 A | 12/2016 |
| KR | 20100055975 A | 5/2010 |
| KR | 20160094565 A | 10/2016 |
| WO | WO 2019/038304 A1 | 2/2019 |
| WO | WO 2020/243383 A1 | 12/2020 |

OTHER PUBLICATIONS

Japanese Office Action for Application No. 2021565989 dated Aug. 8, 2023.
Japanese Office Action for Application No. 2021565989 mailed Dec. 13, 2022.
Korean Office Action for Application No. 1020217039046 dated Apr. 6, 2023.
Korean Office Action for Application No. 1020217039046 dated Oct. 23, 2023.
Puett, Connor et al, "An update on carbon nanotube-enabled X-ray sources for biomedical imaging," WIREs Nanomed Nanobiotechnol 2018, 10:e1475. doi: 10.1002/wnan.1475.
Shan, J et al, "Stationary intraoral digital tomosynthesis using a carbon nanotube X-ray source array," Dentomaxillofacial Radiology (2015) 44, 20150098, British Institute of Radiology.
Inscoe, Christina et al, "Characterization and preliminary imaging evaluation of a clinical prototype stationary intraoral tomosynthesis system," Med. Phys. 45 (11), Nov. 2018, American Association of Physicists in Medicine.

* cited by examiner

MULTI-MODALITY DENTAL X-RAY IMAGING DEVICE AND METHODS

CROSS-REFERENCE TO RELATED APPLICATIONS

This patent application is a continuation of and claims priority to PCT/US2020/035052 filed May 29, 2020, which claims priority to U.S. Provisional Patent Application Ser. No. 62/854,743, filed May 30, 2019, the disclosure of which is incorporated by reference herein.

TECHNICAL FIELD

The subject matter disclosed herein relates to x-ray imaging. More particularly, the subject matter disclosed herein relates to a dental x-ray imaging device that can perform multiple functions including intra-oral x-ray, intraoral tomosynthesis and extra-oral computed tomography.

BACKGROUND

Several x-ray-based imaging technologies are used in dental clinics, including intraoral x-ray radiography, panoramic x-ray, and cone-beam computed tomography (CBCT).

Intraoral radiography is currently the most commonly used imaging tool in dental clinics, often considered to be a vital component of dental screening and diagnosis, and the gold standard for caries detection. Improved efficiency of intraoral receptors, including film, photostimulable phosphor plates, and digital detectors, has greatly reduced the amount of radiation required to obtain images of diagnostic quality. Unfortunately, the features of interest within the dental anatomy are often obscured by superposition of bone, soft tissue, restorations, and dental hardware. This superposition is a fundamental limitation due to the 2D nature of projection radiography and results in low diagnostic accuracy for many tasks. Sensitivity for caries detection ranges from 40 to 70%, depending on the accessibility of the lesion. Root fracture detection is another application of two-dimensional (2D) intraoral radiography that is lacking sensitivity, with features often obscured by adjacent anatomy.

Computed tomography (CT) is a three-dimensional (3D) modality that eliminates the problem of anatomical superposition by acquiring 2D projection images from many different angles and utilizing a reconstruction algorithm to compute a 3D representation of anatomy, presented as a collection of slice images. Cone-beam CT (CBCT) has been incorporated into many dental clinics for treatment planning, including implant site assessment, and evaluation of temporomandibular joint disorders. Though valuable for diagnostic applications, CBCT is not appropriate as a screening tool. The increased radiation dose to the patient, clinician time, and equipment cost outweigh the marginal increase in sensitivity for caries detection.

A recent invention, called stationary intraoral tomosynthesis (s-IOT), overcomes the limitations of the current intra-oral radiography for diagnosis of dentoalveolar disease. The technology has been disclosed in U.S. Pat. Nos. 9,907,520 and 9,782,136, the disclosures of which are incorporated herein by reference in their entirety. As illustrated in FIG. 3, it uses (1) a spatially distributed x-ray source array with a limited number of x-ray focal spots to generate a scanning x-ray from different directions; (2) a high-frame-rate digital intraoral sensor to capture the projection images in synchronization with the x-ray exposure; and (3) a reconstruction algorithm to process the projection images to generate tomosynthesis image slices in real-time. The 3D tomosynthesis slices are reconstructed and displayed layer by layer in the depth direction to "virtually dissect" the object.

S-IOT provides depth information and removes structural overlaps that obscure anatomical details in 2D imaging. It offers better in-plane resolution, less imaging artifact, and faster image acquisition at lower dose and cost comparing to CBCT. Results have shown that s-IOT provides significantly increased detection sensitivity, more accurate assessment of lesion depth and improves the ease of interpretation of the images across a wide variety of clinical settings compared to the current dental imaging technologies.

S-IOT has the potential to replace the conventional 2D intra-oral radiography as the new standard for intraoral imaging.

FIG. 1 illustrates a traditional two-dimensional x-ray machine used in most dental offices. Notice the x-ray device positioned next to the patient's head and the intraoral sensor to be placed in the patient's mouth. FIG. 2 illustrates a CBCT device. The CBCT device includes a gantry that is configured to rotate around the subject positioned underneath the center of rotation of the gantry. FIG. 3 illustrates another imaging device configured for intraoral tomosynthesis, as well as an x-ray source array with multiple x-ray focal spots that is configured for generating x-ray beams for capturing x-ray images of the subject. Notice the intraoral sensor being positioned into the patient's mouth on the right. As shown between the two illustrations in FIG. 3, with intraoral tomosynthesis, the x-ray source array and the intraoral sensor are positioned such that the patient's teeth are between the intraoral sensor and the x-ray source array.

At present, multiple modality dental x-ray imaging machines that are commercially available typically combine CBCT, panoramic, and cephalometry into one. There is no system that combines intraoral imaging with CBCT. Such a device is particularly attractive in markets where space is limited.

SUMMARY

The subject matter of the present application discloses multi-modality dental x-ray imaging systems, device and methods that can perform cone-beam computed tomography (CBCT) imaging, two-dimensional (2D) intraoral x-ray imaging, and intraoral tomosynthesis imaging. Some of the intended uses of the devices and systems described herein include, for non-limiting example, diagnostic and interventional imaging of the oral cavities (the mouth) of subjects.

In accordance with this disclosure, multi-modality dental x-ray imaging systems and methods are provided. In one aspect, an x-ray imaging system configured for performing multiple modality imaging of a subject is disclosed, the multiple modalities including cone-beam computed tomography (CBCT) imaging, two-dimensional (2D) intraoral x-ray imaging, and intraoral tomosynthesis imaging, the x-ray imaging system comprising: a rotatable gantry; an x-ray source array attached to the rotatable gantry and comprising a plurality of spatially distributed x-ray focal spots; a digital area x-ray detector attached to the rotatable gantry, opposite the x-ray source array; an intraoral sensor; an adjustable collimation assembly positioned between the x-ray source array and the subject and configured to limit x-ray radiation generated by the x-ray source array to a surface of either the intraoral sensor or the digital area x-ray detector depending on an imaging mode the x-ray imaging system is operating in; and a control unit comprising one or more processors, the control unit configured to operate the x-ray imaging system in: either a 2D intraoral x-ray imaging mode or an intraoral tomosynthesis imaging mode using the x-ray source array and the intraoral sensor; or a CBCT imaging mode using the digital area x-ray detector and the x-ray source array.

In some embodiments, the x-ray imaging system is configured in the CBCT mode to: rotate the digital area x-ray detector and the x-ray source array around a region of interest of the subject; and use an x-ray beam from one x-ray focal spot of the plurality of spatially distributed x-ray focal spots to record one or more projection images, wherein x-ray exposure is in synchronization with data collection by the digital area x-ray detector. In some embodiments, the x-ray imaging system is configured in the intraoral tomosynthesis imaging mode to: align the x-ray source array with an intraoral sensor within the subject's mouth; collimate x-ray radiation to a surface of the intraoral sensor; sequentially activate x-ray radiation from multiple x-ray focal spots within the x-ray source array to produce multiple projection images from multiple viewing angles without any mechanical movement of the x-ray source array or the intraoral sensor; and reconstruct the multiple projection images into a tomosynthesis image stack.

In some embodiments, the x-ray source array is configured to generate x-ray radiation from multiple x-ray focal spots; wherein at least one x-ray focal spot of the plurality of spatially distributed x-ray focal spots has a first focal spot size and a remainder of the plurality of spatially distributed x-ray focal spots has a second focal spot size, wherein the spatially distributed x-ray focal spots having the second focal spot size are all substantially the same size; and wherein radiation from the at least one x-ray focal spot with the first focal spot size is configured for CBCT imaging and radiation originating from a remainder of the plurality of spatially distributed x-ray focal spots with the second focal spot size is configured for intraoral tomosynthesis imaging. In some further embodiments, the x-ray source array is configured to operate at an anode voltage of between about 50 kV and 200 kV.

In some embodiments, the x-ray source array is configured to operate at an anode voltage of between, and including, about 60 kV and 70 kV in the 2D intraoral x-ray imaging mode and the intraoral tomosynthesis imaging mode. In some embodiments, the x-ray source array is configured to operate at an anode voltage of between, and including, about 60 kV and 120 kV in the CBCT imaging mode.

In some embodiments, the x-ray source array is a carbon nanotube-based field emission x-ray source array. In some embodiments, the intraoral sensor is flexible and can conform substantially to a lingual surface of teeth of the subject. In some further embodiments, the x-ray imaging system is configured to perform a small angle rotation of the x-ray source array with respect to a rotation axis, while the intraoral sensor remains stationary, thereby performing large angle intraoral tomosynthesis imaging.

In another aspect a method for performing multiple modality x-ray imaging of a subject, including cone-beam computed tomography (CBCT) imaging, two-dimensional (2D) intraoral x-ray imaging, and intraoral tomosynthesis imaging, the method comprising: providing an x-ray imaging system comprising: a rotatable gantry; an x-ray source array attached to the rotatable gantry and comprising a plurality of spatially distributed x-ray focal spots; a digital area x-ray detector attached to the rotatable gantry, opposite the x-ray source array; an intraoral sensor; an adjustable collimation assembly positioned between the x-ray source array and the subject and configured to limit x-ray radiation generated by the x-ray source array to a surface of either the intraoral sensor or the digital area x-ray detector, depending on an imaging mode the x-ray imaging system is operating in; and a control unit comprising one or more processors, the control unit configured to operate the x-ray imaging system in: either a 2D intraoral x-ray imaging mode or an intraoral tomosynthesis imaging mode using the x-ray source array and the intraoral sensor; or a CBCT imaging mode using the digital area x-ray detector and the x-ray source array; operating the x-ray imaging system in either the 2D intraoral x-ray imaging mode, the intraoral tomosynthesis imaging mode, or the CBCT mode; and using the x-ray imaging system to capture one or more images of an area of interest of the subject.

In some embodiments, the method further comprises, in the CBCT mode: rotating the digital area x-ray detector and the x-ray source array around the region of interest of the subject; and using an x-ray beam from one x-ray focal spot of the plurality of spatially distributed x-ray focal spots to record one or more projection images with x-ray exposure in synchronization with data collection by the digital area x-ray detector. In some embodiments, in the intraoral tomosynthesis imaging mode, the method further comprises aligning the x-ray source array with an intraoral sensor within the subject's mouth; sequentially activating x-ray radiation from multiple x-ray focal spots within the x-ray source array to produce multiple projection images from multiple viewing angles without any mechanical movement of the x-ray source array or the intraoral sensor; and reconstructing the multiple projection images into a tomosynthesis image stack.

In some embodiments, the method further comprises operating the x-ray source array at an anode voltage of between about 50 kV and 120 kV. In some embodiments, the method further comprises performing a small angle rotation of the x-ray source array with respect to the center of rotation of the x-ray source array and the digital area x-ray detector while the intraoral sensor remains stationary, thereby performing large angle intraoral tomosynthesis imaging.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The subject matter of the present disclosure includes a multiple modality x-ray imaging device or system that is configured to perform cone-beam computed tomography (CBCT) imaging, intraoral x-ray imaging, and/or intraoral tomosynthesis imaging. In some embodiments, the devices and systems of the present disclosure can be used for, inter alia, the diagnosis and detection of dental and oral lesions, caries, or other oral disease.

Figure 1:
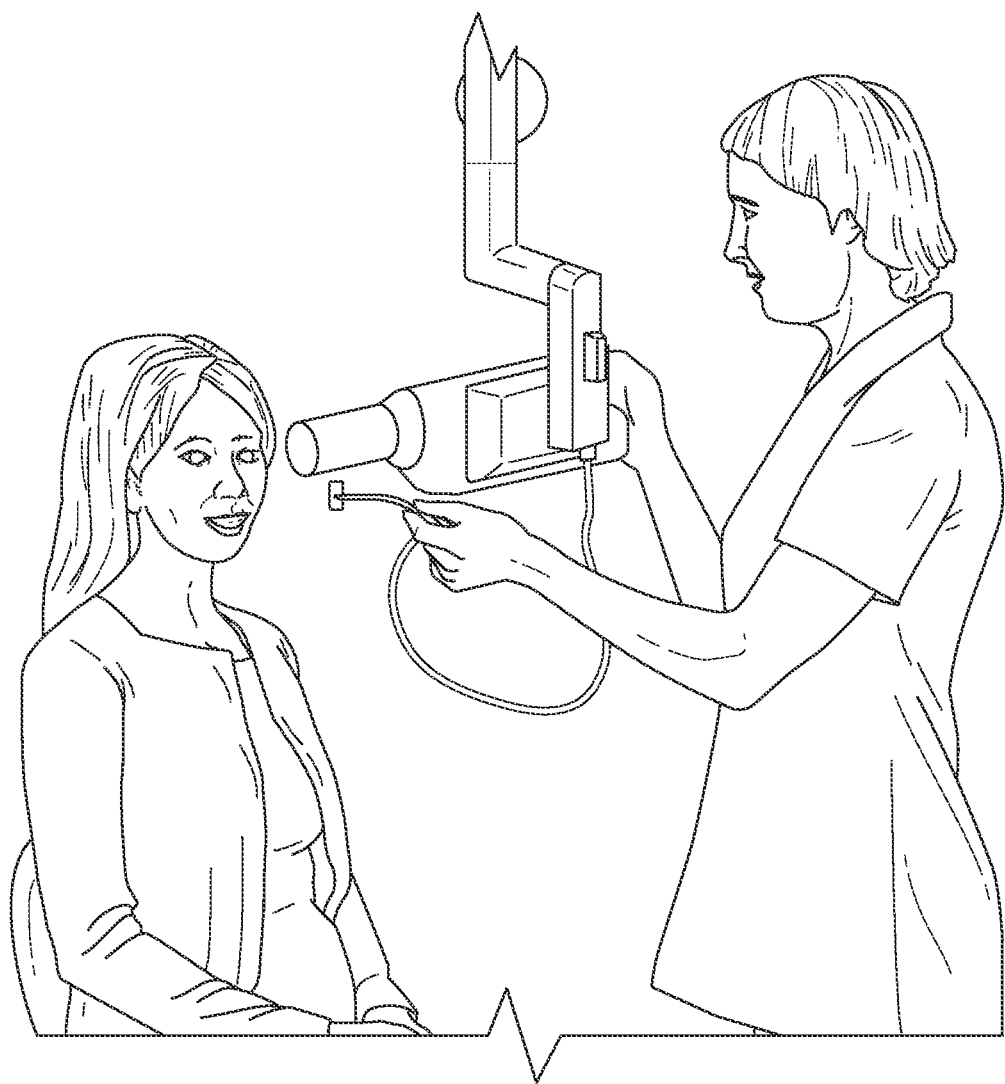
FIG. 1 is an illustration of a typical two-dimensional intraoral x-ray device well known in the art and in use at dental clinics.
Figure 2:
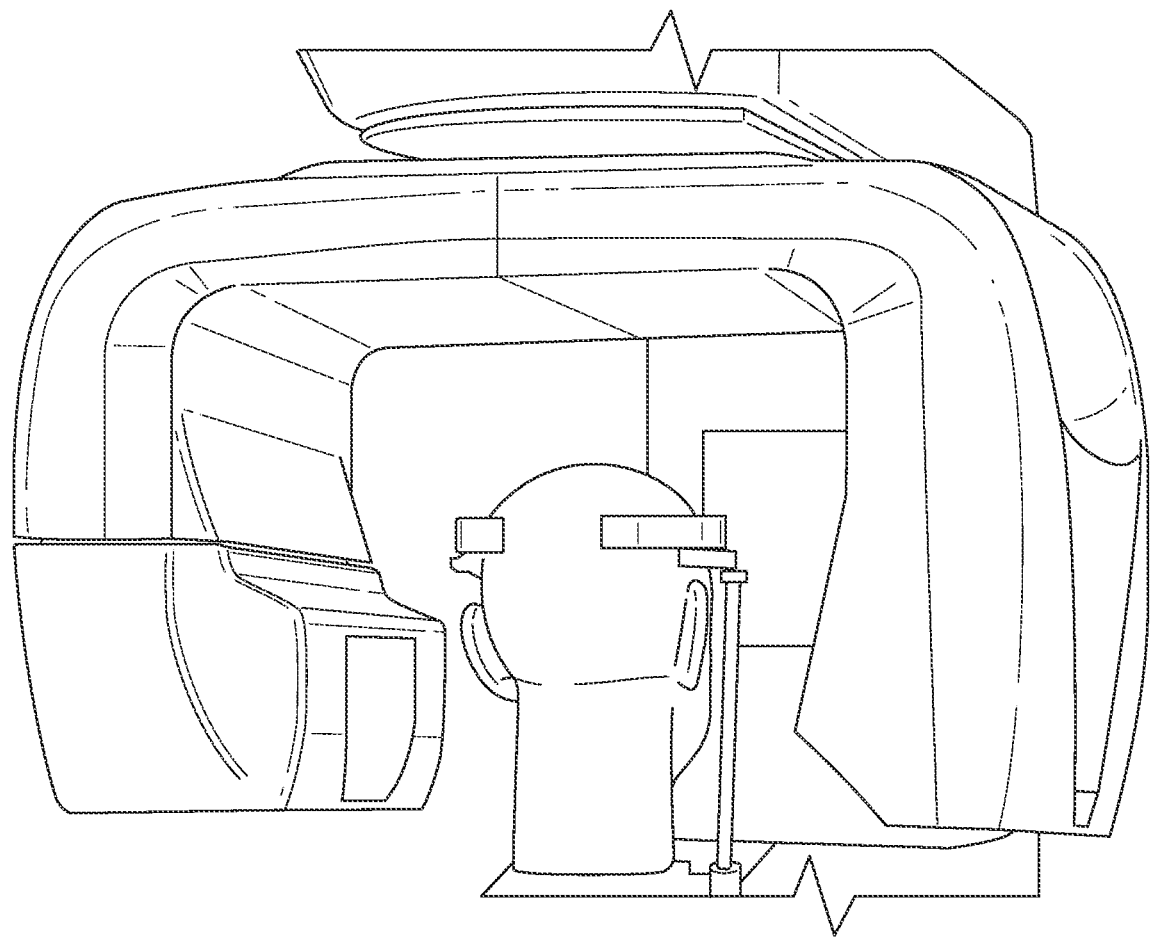
FIG. 2 is an illustration of a typical cone-beam computer tomography scanner known in the art.
Figure 3:
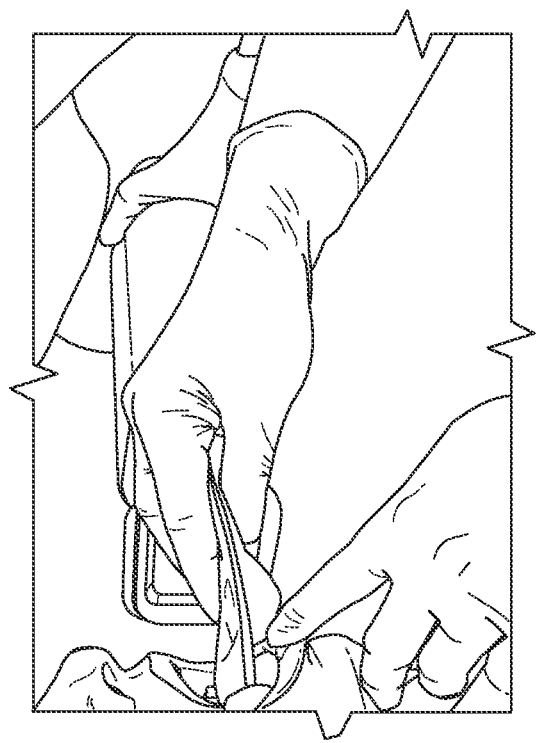
FIG. 3 is an illustration of a typical intraoral tomosynthesis device and its use in a clinical setting.
Figure 3:
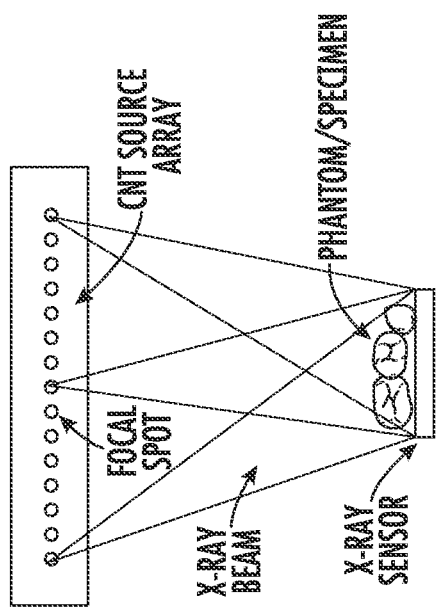
Figure 4A:
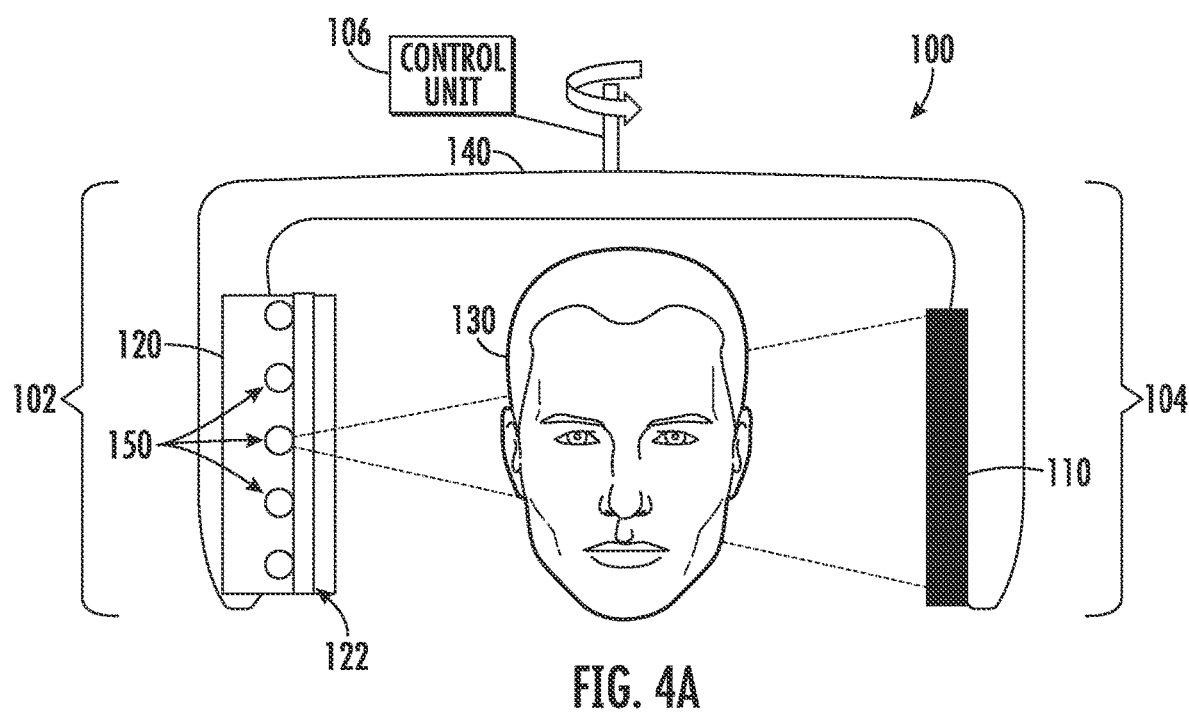
FIG. 4A illustrates a schematic of an example multiple modality x-ray imaging device of the present disclosure.

Referring to FIG. 4A, the x-ray imaging device or system 100 of the present invention comprises a rotating gantry 140 that is connected to a mechanical stand. In some embodiments, the gantry 140 can be connected to or be in communication with a controller or control unit 106 comprising one or more processors, computer readable media, and executable instructions. The gantry 140 can, in some embodiments, be powered by the control unit 106 or it can have its own independent power supply. The gantry 140 is configured to rotate 360 degrees about an axis. In some embodiments, the control unit 106 and/or the gantry 140 can comprise a power supply that provides the necessary power to operate the x-ray imaging device or system 100. In some embodiments, the gantry 140 comprises a first portion 102 and a second portion 104 opposite the first portion. In some embodiments, the first portion 102 and the second portion 104 are spaced apart with respect to each other such that a human or other subject can be positioned under the rotating axis of the gantry 140 and between the first portion 102 and the second portion 104. In either case, both the first portion 102 and the second portion 104 are configured such that different devices can be attached to them.

In some embodiments, the x-ray imaging device or system 100 is based on a computed tomography (CT) scanner, wherein the conventional single-beam x-ray tube is replaced with an x-ray source array 120 comprising a plurality of spatially distributed and individually controllable x-ray focal spots 150. In some embodiments, the spatially distributed x-ray source array 120 can be pivotably attached to the first portion 102 of the gantry 140. In some embodiments, a digital area x-ray detector 110 can be attached to the second portion 104 on an opposite side of the x-ray source array 120. In some embodiments, a collimation assembly 122 can be provided the collimation assembly 122 comprising a collimator which is configured to substantially collimate the x-ray radiation generated from the x-ray source array 120. In some embodiments, the collimation assembly 122 is adjustable and is configured to shape the x-ray radiation into a cone-shaped beam. In some embodiments, the collimation assembly 122 is configured such that an angle of the cone-shaped beam that is generated by the x-ray source array 120 can be changed. In some embodiments the x-ray imaging device or system 100, via the control unit 106, is configured to operate in a cone-beam computed tomography (CBCT) imaging mode, an intraoral x-ray imaging mode, and/or an intraoral tomosynthesis imaging mode.

Figure 4B:
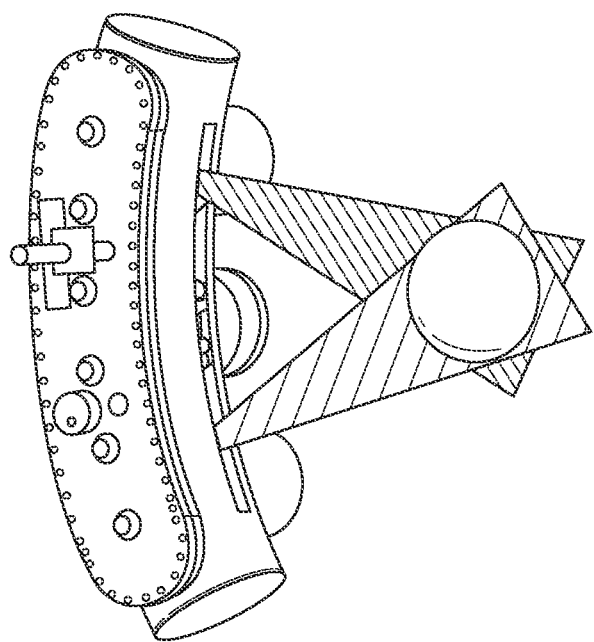
FIG. 4B and FIG. 4C are illustrations of a curved carbon nanotube (CNT) x-ray source and a linear-shaped CNT x-ray source.
Figure 4C:
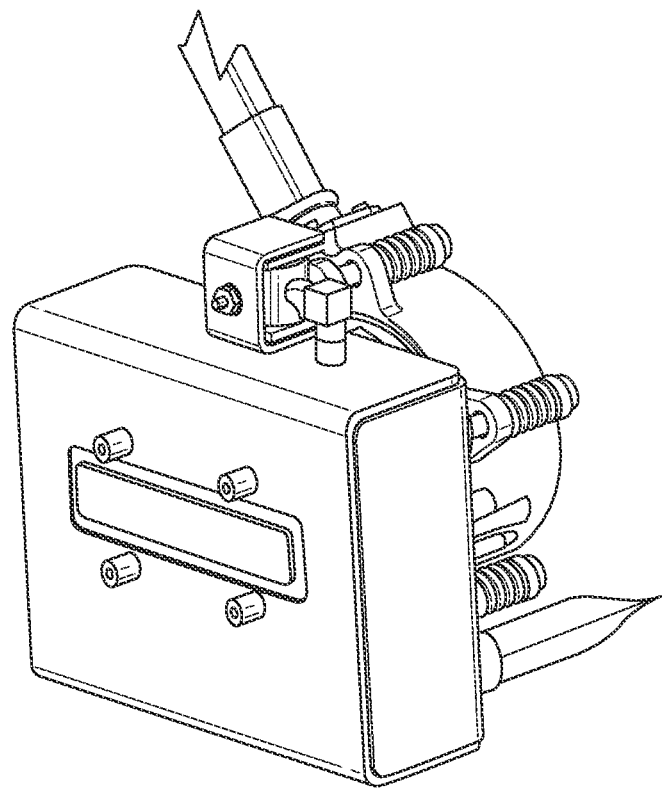

In some embodiments of the present disclosure, the x-ray source array 120 comprises a carbon nanotube (CNT) based field emission x-ray source array. A CNT x-ray source array utilizes an array of individually controllable CNT field emitters to generate electrons at room temperature, wherein the electrons are accelerated to bombard the anode to produce x-rays from multiple focal spots on either one extended x-ray anode or multiple x-ray anodes. In some embodiments of the present disclosure, the CNT field emitters are connected to an electronic switching device. By electronically switching the individual CNT cathodes on and off, a scanning x-ray beam can be produced from different viewing angles to collect a plurality of projection images. FIG. 4B illustrates this principle. In some embodiments, the CNT x-ray source array can be arranged in a curved fashion, such as shown in, for example without limitation, FIG. 4B. However, in some embodiments the CNT x-ray source array does not have to be shaped in a curved manner but can be straight or linear. Such a straight or linearly shaped CNT x-ray source array is illustrated in FIG. 4C.

With CNTs, electrons are produced at room temperature using field emission. By applying an electrical potential difference across a very sharp object, electrons may be produced at the tip of the sharp object. One requirement of x-ray imaging with modern x-ray tubes and CNTs includes focusing of each of the electron sources. In 2002, Zhou, Lu, and colleagues demonstrated that CNTs could serve as effective field emitters for x-ray sources, due to their atomically sharp tips and high mechanical stability. The CNT x-ray sources can be positioned in close proximity, allowing the creation of multi-beam x-ray sources for a variety of applications.

The electron field emission x-ray source and x-ray source array technologies were initially disclosed in several U.S. patents including U.S. Pat. No. 6,553,096 entitled "X-ray Generating Mechanism Using Electron Field Emission Cathode", U.S. Pat. Nos. 6,850,595, and 6,876,724.

In some embodiments, the x-ray imaging device or system 100 comprises between, and including, about three and sixty individually controllable CNT emitters as electron sources. In some embodiments, the x-ray source array has a unipolar design. In some embodiments, the x-ray source array has an anode voltage of between, and including, about 10 kV and 120 kV and an x-ray tube current of between, and including, about 1 mA and 30 mA.

CNT based field emission x-ray source arrays for different imaging applications including medical and securities have been commercially produced by companies including Xin-Ray Systems and more recently by NuRay Technologies. The construction and performances of some CNT x-ray source arrays have also been described in technical publications including Connor Puett et al. in "An Update on Carbon Nanotube-Enabled X-Ray Sources for Biomedical Imaging", WIREs Nanomed Nanobiotechnology 2017, e1475. doi: 10.1002/wnan.1475, the disclosure of which is expressly incorporated by reference herein in its entirety.

The CNT x-ray source arrays for intraoral tomosynthesis was disclosed in the commonly owned, patent applications and issued patents, which are expressly incorporated by reference herein in their entireties: U.S. Pat. No. 9,907,520, issued Mar. 6, 2018, entitled DIGITAL TOMOSYNTHESIS SYSTEMS, METHODS, AND COMPUTER READABLE MEDIA FOR INTRAORAL DENTAL TOMOSYNTHESIS IMAGING; and U.S. Pat. No. 9,782,136, issued Oct. 10, 2017, entitled INTRAORAL TOMOSYNTHESIS SYSTEMS, METHODS, AND COMPUTER READABLE MEDIA FOR DENTAL IMAGING.

The intraoral tomosynthesis technology and the CNT x-ray source array for intraoral tomosynthesis was also disclosed in the following technical publications, the disclosures of which are expressly incorporated herein by reference in their entireties:

"Stationary Intra-Oral Digital Tomosynthesis Using A Carbon Nanotube X-Ray Source Array", Jing Shan, Andrew W. Tucker, Laurence R. Gaalaas, Gongting Wu, Enrique Platin, Andre Mol, Jianping Lu, Otto Zhou, Dentomaxillofacial Radiology 44 (9), 20150098.

"Characterization And Preliminary Imaging Evaluation Of A Clinical Prototype Stationary Intraoral Tomosynthesis System", Inscoe, C. R., Platin, E., Mauriello, S. M., Broome, A., Mol, A., Gaalaas, L. R., Regan Anderson, M. W., Puett, C., Lu, J. & Zhou, O. 2018, Medical Physics, vol. 45, no. 11, pp. 5172-5185.

In some embodiments, the x-ray source array 120 is used for both CBCT imaging and for intraoral imaging. As the x-ray source array 120 and the digital area x-ray detector 110 rotate about the axis, they turn in a circle, which can be referred to as a source-detector rotation circle. As shown in FIG. 4A, the plurality of x-ray focal spots 150 of the x-ray source array 120 can be aligned in an array which is parallel to a plane of the digital area x-ray detector 110 and is perpendicular to a tangent direction of the source-detector rotation circle.

Cone Beam Computed Tomography (CBCT)

In some embodiments, when operating in the CBCT imaging mode, the x-ray imaging device or system 100 can be configured to use x-ray radiation from one x-ray focal spot of the plurality of x-ray focal spots 150 to capture one or more images of an area of interest of a subject 130. In this embodiment, when only one x-ray focal spot is used, the cone-beam shaped x-ray radiation beam generated by the one x-ray focal spot can have a wider-angle cone-beam than individual x-ray focal spots when multiple x-ray focal spots are used. The collimation assembly 122 is configured to ensure that cone angles are wide or narrow enough depending on whether one x-ray focal spot is used or multiple. In order to capture images in the CBCT imaging mode, the x-ray imaging device 100 is configured such that the x-ray source array 120 and the digital area x-ray detector 110 can be rotated around the subject 130. While operating in the CBCT imaging mode, the x-ray imaging device or system 100 is configured to pulse x-ray radiation from the one x-ray focal spot in order to illuminate the area of interest of the subject 130. The one or more x-ray images are recorded by the digital area x-ray detector 110.

In some embodiments, the digital area x-ray detector 110 is in electronic communication with either the control unit 106 or some other electronic device comprising one or more processors, such as a computer or workstation, one or more monitors, and/or one or more storage devices, such as a hard drive or solid-state drive. In some embodiments, the digital area x-ray detector 110 is in communication with the control unit 106 or the other electronic device via a wireless or wired connection. In some embodiments, the control unit 106, or some other controller comprising one or more processors, is configured to program the x-ray source array 120 and/or the digital area x-ray detector 110. In some embodiments, once the images have been captured by the digital area x-ray detector 110 they can be transmitted to the other controller or computer in electronic communication with the x-ray imaging device or system 100 or the images can be sent to the control unit 106 for processing, electronic storage, and/or displaying for a user of the system.

Figure 5:
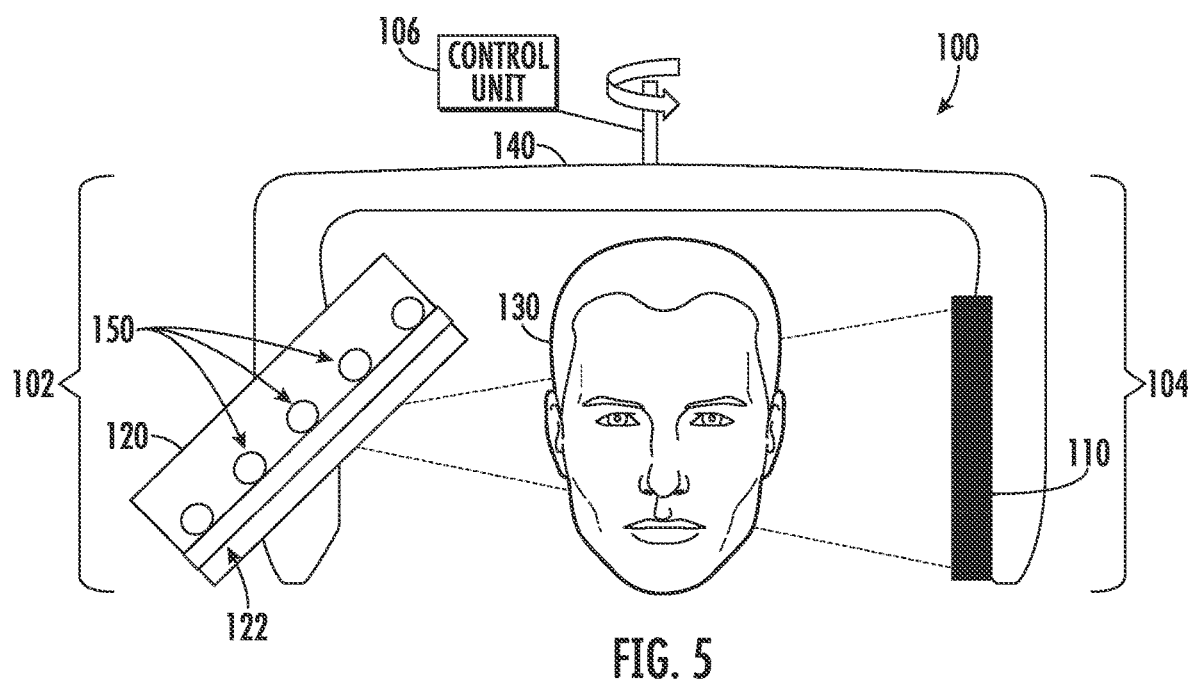
FIG. 5 illustrates a schematic of an example multiple-modality x-ray imaging device of the present disclosure having a rotatable x-ray source.

FIG. 5 illustrates that the x-ray source array 120 is capable of rotating, without a need for moving the gantry 140, to a proper position for the various imaging modes. The benefit of this feature is that a more precise image capture can be performed of the subject's area of interest. Additionally, the rotating gantry 140 allows some flexibility in positioning the x-ray source array 120 with respect to an intraoral sensor (described hereinbelow) for intraoral tomosynthesis imaging. In some embodiments, the x-ray exposure from the x-ray source array 120 is in synchronization with data collection by the digital area x-ray detector 110.

Intraoral Tomosynthesis

Figure 6:
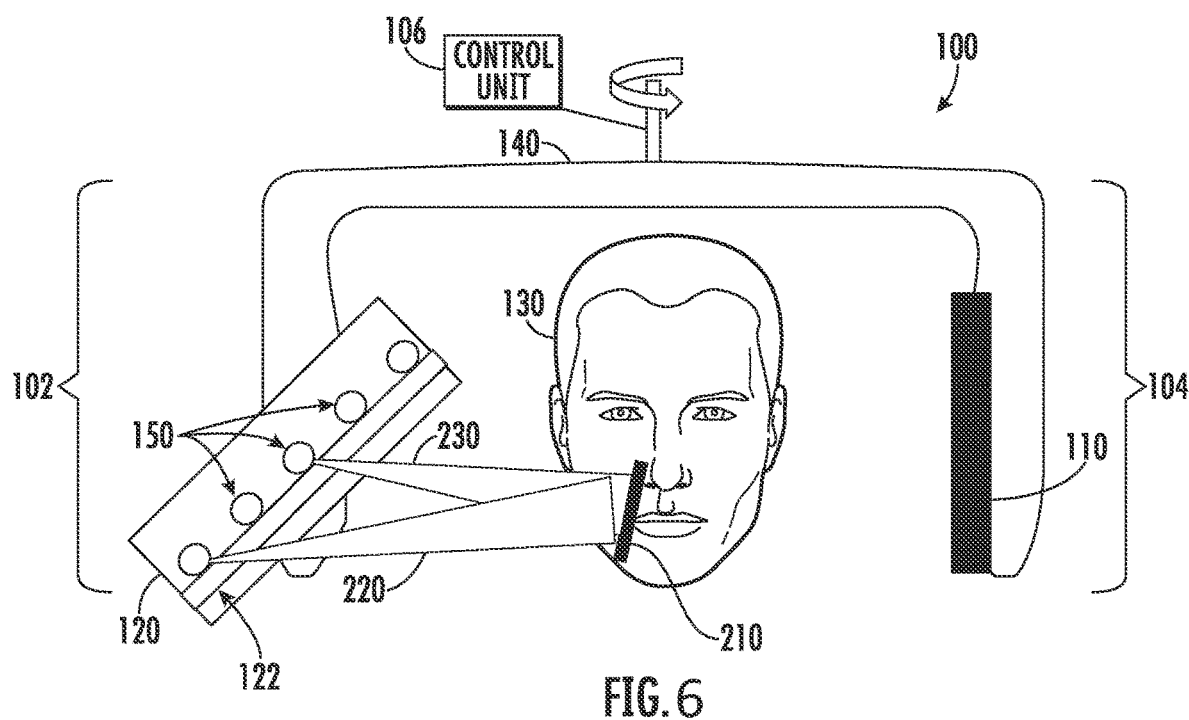
FIG. 6 illustrates a schematic of an example multiple-modality x-ray imaging device of the present disclosure having a rotatable x-ray source and intraoral x-ray detector.
Figure 7:
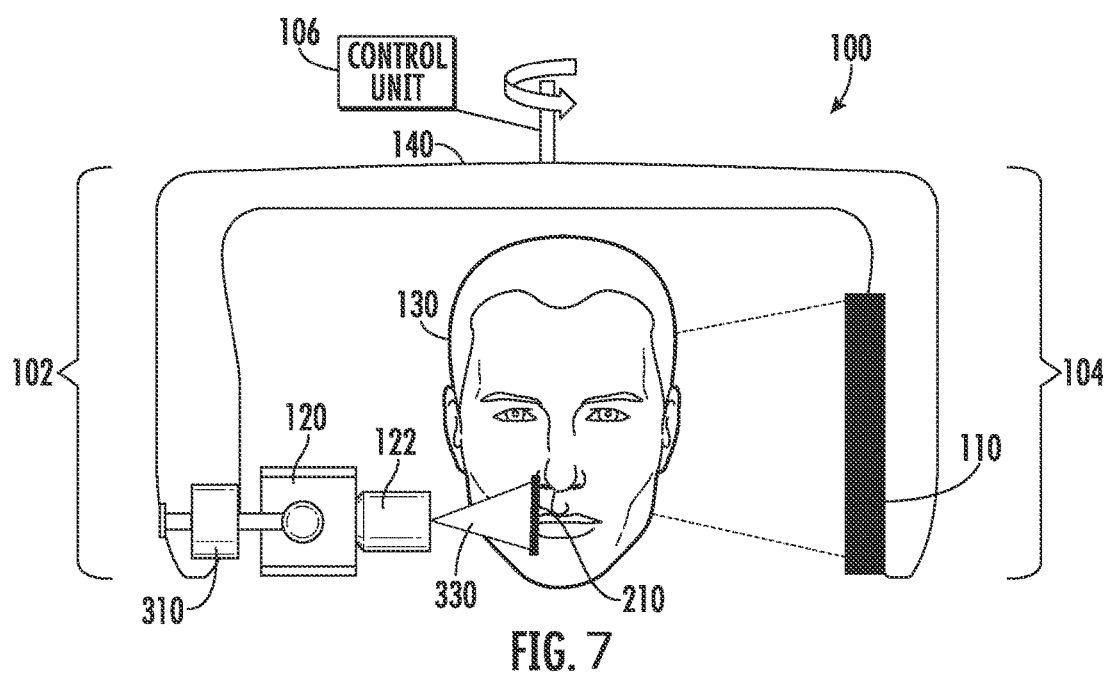
FIG. 7 illustrates a schematic of an example multiple-modality x-ray imaging device of the present disclosure having a collimation assembly.

Referring to FIG. 6, in some embodiments of the present disclosure, the x-ray imaging device or system 100 is configured to operate in an intraoral tomosynthesis imaging mode. In the intraoral tomosynthesis imaging mode the x-ray imaging device or system 100 is configured to use the x-ray source array 120 and a dynamic intraoral sensor 210 placed inside the subject's mouth to capture images. Although FIG. 6 and FIG. 7 depict the dynamic intraoral sensor 210 as being visible outside the subject's 130 mouth, the intraoral sensor 210 would actually be placed inside the mouth. In some embodiments, the intraoral sensor 210 can be flexible and can conform substantially to a lingual surface of the teeth of a subject 130. Additionally, multiple x-ray beams generated from multiple focal spots of the plurality of spatially distributed x-ray focal spots 150 are used to generate a series of projection images of the area of interest of the subject 130. For example and without limitation, two x-ray beams 220 and 230 from two x-ray focal spots on the anode are shown in FIG. 6. In some embodiments, the x-ray imaging device or system 100 is configured align the x-ray source array 120 with the dynamic intraoral sensor 210 within the subject's 130 mouth. In some embodiments, in the intraoral tomosynthesis imaging mode, the x-ray imaging device or system 100 is further configured to collimate x-ray radiation to a surface of the dynamic intraoral sensor 210.

In some embodiments, the x-ray imaging device or system 100 is configured to sequentially activate x-ray radiation from multiple x-ray focal spots of the plurality of x-ray focal spots 150 to produce multiple projection images from multiple viewing angles without any mechanical movement of the x-ray source array 120 or the intraoral sensor 210.

The projection images are recorded by the intraoral x-ray sensor 210. In some embodiments, the intraoral x-ray sensor 210 is in electronic communication with the control unit 106 and/or some other processing unit, computer, or device capable of processing or reconstructing the multiple projection images into a tomosynthesis image stack. After the images have been captured, the x-ray device or system 100 is configured to transmit the images to the control unit 106 or other processing unit in electronic communication with the intraoral x-ray sensor 210. The intraoral x-ray sensor 210 can be in electronic communication with the control unit 106 or other processing unit via wired or wireless connection(s). The projection images are then processed by the control unit 106 or other computer and used for tomosynthesis reconstruction to process or reconstruct the multiple projection images into a tomosynthesis image stack.

In some embodiments of the present disclosure, the x-ray imaging device or system 100 is configured to perform a small-angle rotation (e.g., between, and including, about 5 and 30 degrees) of the x-ray source array 120 with respect to a central rotation axis of the gantry 140 while the intraoral sensor 210 remains stationary, thereby performing large angle intraoral tomosynthesis imaging.

Furthermore, in some embodiments of the present disclosure, the x-ray imaging device or system 100 is configured to perform a rotation of the x-ray source array 120 and the digital area x-ray detector 110 with respect to a central rotation axis of the gantry 140, thereby performing large angle extraoral tomosynthesis imaging.

Two-Dimensional (2D) Intraoral Imaging

In some embodiments, the x-ray imaging device or system 100 is configured to operate in a two-dimensional (2D) intraoral x-ray imaging mode, which is well known in the prior art. Those having ordinary skill in the art will appreciate that in 2D intraoral x-ray imaging mode, the x-ray imaging device or system 100 is configured to use one of the x-ray focal spots 150 in addition to the intraoral sensor 210 to capture the 2D intraoral x-ray images of the area of interest of the subject 130.

Referring to FIG. 7, and in some embodiments, in the intraoral tomosynthesis mode, an adjustable multi-beam collimator or collimation assembly 122 is positioned between the x-ray source array 120 and the subject 130. In some embodiments, the collimation assembly 122 is configured to limit, affect, or filter radiation 330 from each of the x-ray focal spots 150 to substantially illuminate an area of the intraoral x-ray sensor 210 or the digital area x-ray detector 110 based on a mode of operation of the x-ray imaging device or system. Furthermore, in some embodiments, the x-ray source array 120 can be mounted on a degree-of-freedom structure 310 to enable manipulation of the orientation and position of the x-ray source array 120 such that it can be aligned with the intraoral sensor 210 placed in the subject's 130 mouth.

In some embodiments, the x-ray imaging device or system 100 of the present disclosure comprises an energy control unit that can set the output energy of the x-ray source 120 to different levels, depending on the imaging need. For example and without limitation, the energy control unit can set the voltage of the x-ray source array 120 to between, and including, about 50 kV and 200 kV. Furthermore, in some embodiments, the energy control unit can set the voltage to, for example and without limitation, between, and including, about 60 kV and 70 kV for intraoral x-ray imaging and between, and including, about 60 kV and 120 kV for CBCT imaging. In some embodiments, the energy control unit can be integrated into the control unit 106 or it can be a separate device that is in electronic communication with the x-ray source array 120.

In some embodiments, the device can further comprise a graphical-user-interface, monitor, screen, or other device in electronic communication with the control unit 106, that allows a user to choose the imaging modality and the imaging protocol as well as view the images created by the x-ray imaging device or system 100.

Figure 8:
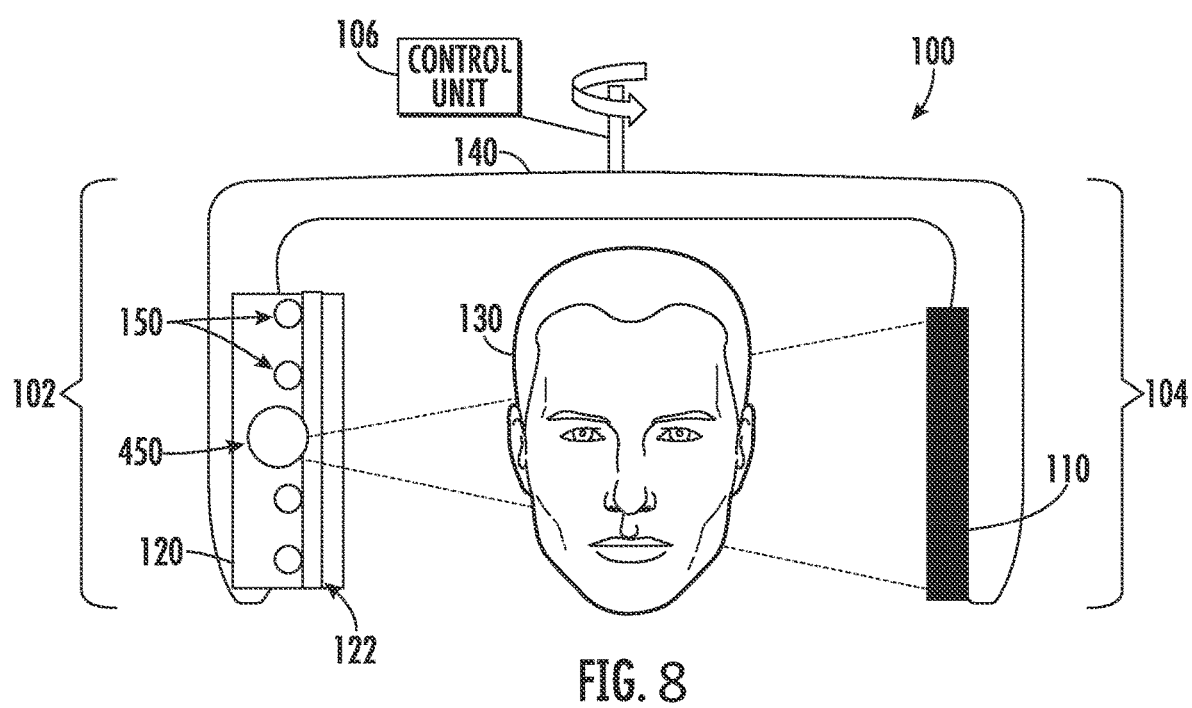
FIG. 8 illustrates a schematic of an example multiple-modality x-ray imaging device of the present disclosure having a central x-ray focal spot that is significantly larger than the other x-ray focal spots.

As illustrated in FIG. 8, in some embodiments, the x-ray source array 120 can comprise at least one larger x-ray focal spot 450 that has a first focal spot size and the remainder of the plurality of x-ray focal spots 150 have a second focal spot size. In some embodiments, the first focal spot size of the at least one x-ray focal spot 450 is a larger size (e.g., between, and including, about IEC 0.7 and IEC 1.3) than the second focal spot size (e.g., between, and including, about IEC 0.3 and IEC 0.7). In one example the larger x-ray focal spot 450 can be used for CBCT imaging, whereas the smaller ones 150 can be used for intraoral tomosynthesis imaging and intraoral radiography. In one example, the other x-ray focal spots 150 and the larger x-ray focal spot 450 are arranged in a linear fashion on the x-ray anode or anodes, as illustrated in FIG. 8. In another example the focal spots are arranged in a pre-determined pattern on a plane, such as along the circumference of a circle.

In some aspects, standard two-dimensional intraoral x-ray radiographs of the area of interest of the subject 130 can be obtained using the x-ray radiation from one focal spot 150 of the x-ray source array 120.

In some embodiments of the present disclosure, the x-ray source array 120 is a carbon nanotube-based field emission x-ray source array.

The present subject matter can be embodied in other forms without departure from the spirit and essential characteristics thereof. The embodiments described therefore are to be considered in all respects as illustrative and not restrictive. Although the present subject matter has been described in terms of certain specific embodiments, other embodiments that are apparent to those of ordinary skill in the art are also within the scope of the present subject matter.

What is claimed is:

1. An x-ray imaging system configured for performing multiple modality imaging of a subject, including cone-beam computed tomography (CBCT) imaging, two-dimensional (2D) intraoral x-ray imaging, and intraoral tomosynthesis imaging, the x-ray imaging system comprising:
   a rotatable gantry;
   an x-ray source array attached to the rotatable gantry and comprising a plurality of spatially distributed x-ray focal spots, wherein:
      the x-ray source array is configured to generate x-ray radiation from multiple x-ray focal spots;
      at least one x-ray focal spot of the plurality of spatially distributed x-ray focal spots has a first focal spot size and a remainder of the plurality of spatially distributed x-ray focal spots has a second focal spot size;
      the spatially distributed x-ray focal spots having the second focal spot size are all substantially the same size; and
      radiation from the at least one x-ray focal spot with the first focal spot size is configured for CBCT imaging and radiation originating from a remainder of the plurality of spatially distributed x-ray focal spots with the second focal spot size is configured for intraoral tomosynthesis imaging;
   a digital area x-ray detector attached to the rotatable gantry, opposite the x-ray source array;
   an intraoral sensor;
   an adjustable collimation assembly positioned between the x-ray source array and the subject and configured to limit x-ray radiation generated by the x-ray source array to a surface of either the intraoral sensor or the digital area x-ray detector depending on an imaging mode the x-ray imaging system is operating in; and
   a control unit comprising one or more processors, the control unit configured to operate the x-ray imaging system in any of:
      a 2D intraoral x-ray imaging mode using the x-ray source array and the intraoral sensor;
      an intraoral tomosynthesis imaging mode using the x-ray source array and the intraoral sensor; and
      a CBCT imaging mode using the digital area x-ray detector and the x-ray source array.

2. The x-ray imaging system of claim 1, configured in the CBCT mode to:
   rotate the digital area x-ray detector and the x-ray source array around a region of interest of the subject; and
   use an x-ray beam from one x-ray focal spot of the plurality of spatially distributed x-ray focal spots to record one or more projection images, wherein x-ray exposure is in synchronization with data collection by the digital area x-ray detector.

3. The x-ray imaging system of claim 1, configured in the intraoral tomosynthesis imaging mode to:
align the x-ray source array with the intraoral sensor within a mouth of the subject;
collimate x-ray radiation to a surface of the intraoral sensor;
produce multiple projection images from multiple viewing angles without any mechanical movement of the x-ray source array or the intraoral sensor; and
reconstruct the multiple projection images into a tomosynthesis image stack.

4. The x-ray imaging system of claim 1, wherein the x-ray source array is configured to operate at an anode voltage of between about 50 KV and 200 kV.

5. The x-ray imaging system of claim 4, wherein the x-ray source array is configured to operate at an anode voltage of between, and including, about 60 KV and 70 kV in the 2D intraoral x-ray imaging mode and the intraoral tomosynthesis imaging mode.

6. The x-ray imaging system of claim 4, wherein the x-ray source array is configured to operate at an anode voltage of between, and including, about 60 kV and 120 kV in the CBCT imaging mode.

7. The x-ray imaging system of claim 1, wherein the x-ray source array is a carbon nanotube-based field emission x-ray source array.

8. The x-ray imaging system of claim 1 wherein the intraoral sensor is flexible and can conform substantially to a lingual surface of teeth of the subject.

9. The x-ray imaging system of claim 1, further configured to perform a small angle rotation of the x-ray source array with respect to a rotation axis, while the intraoral sensor remains stationary, thereby performing large angle intraoral tomosynthesis imaging.

10. A method for performing multiple modality x-ray imaging of a subject, including cone-beam computed tomography (CBCT) imaging, two-dimensional (2D) intraoral x-ray imaging, and intraoral tomosynthesis imaging, the method comprising:
providing an x-ray imaging system comprising:
a rotatable gantry;
an x-ray source array attached to the rotatable gantry and comprising a plurality of spatially distributed x-ray focal spots;
a digital area x-ray detector attached to the rotatable gantry, opposite the x-ray source array, wherein:
the x-ray source array is configured to generate x-ray radiation from multiple x-ray focal spots;
at least one x-ray focal spot of the plurality of spatially distributed x-ray focal spots has a first focal spot size and a remainder of the plurality of spatially distributed x-ray focal spots has a second focal spot size;
the spatially distributed x-ray focal spots having the second focal spot size are all substantially the same size; and
radiation from the at least one x-ray focal spot with the first focal spot size is configured for CBCT imaging and radiation originating from a remainder of the plurality of spatially distributed x-ray focal spots with the second focal spot size is configured for intraoral tomosynthesis imaging;
an intraoral sensor;
an adjustable collimation assembly positioned between the x-ray source array and the subject and configured to limit x-ray radiation generated by the x-ray source array to a surface of either the intraoral sensor or the digital area x-ray detector, depending on an imaging mode the x-ray imaging system is operating in; and
a control unit comprising one or more processors, the control unit configured to operate the x-ray imaging system in any of:
a 2D intraoral x-ray imaging mode or an intraoral tomosynthesis imaging mode using the x-ray source array and the intraoral sensor;
an intraoral tomosynthesis imaging mode using the x-ray source array and the intraoral sensor; and
a CBCT imaging mode using the digital area x-ray detector and the x-ray source array;
operating the x-ray imaging system in one of the 2D intraoral x-ray imaging mode, the intraoral tomosynthesis imaging mode, or the CBCT mode; and
using the x-ray imaging system to capture one or more images of an area of interest of the subject.

11. The method of claim 10, further comprising, in the CBCT mode:
rotating the digital area x-ray detector and the x-ray source array around the region of interest of the subject; and
using an x-ray beam from one x-ray focal spot of the plurality of spatially distributed x-ray focal spots to record one or more projection images with x-ray exposure in synchronization with data collection by the digital area x-ray detector.

12. The method of claim 10, further comprising, in the intraoral tomosynthesis imaging mode:
aligning the x-ray source array with the intraoral sensor within a mouth of the subject;
producing multiple projection images from multiple viewing angles without any mechanical movement of the x-ray source array or the intraoral sensor; and
reconstructing the multiple projection images into a tomosynthesis image stack.

13. The method of claim 10, further comprising operating the x-ray source array at an anode voltage of between about 50 kV and 120 kV.

14. The method of claim 13, wherein the x-ray source array is configured to operate at an anode voltage of between, and including, about 60 kV and 70 kV in the 2D intraoral x-ray imaging mode and the intraoral tomosynthesis imaging mode.

15. The method of claim 13, wherein the x-ray source array is configured to operate at an anode voltage of between, and including, about 60 kV and 120 kV in the CBCT imaging mode.

16. The method of claim 10, wherein the x-ray source array is a carbon nanotube-based field emission x-ray source array.

17. The method of claim 10, wherein the intraoral sensor is flexible and can conform substantially to a lingual surface of teeth of the subject.

18. The method of claim 10, further comprising performing a small angle rotation of the x-ray source array with respect to the center of rotation of the x-ray source array and the digital area x-ray detector while the intraoral sensor remains stationary, thereby performing large angle intraoral tomosynthesis imaging.

* * * * *